United States Patent
Kadam et al.

(10) Patent No.: US 12,024,112 B1
(45) Date of Patent: Jul. 2, 2024

(54) VEHICLE SEAT WITH RESTRAINT SYSTEM

(71) Applicant: Ford Global Technologies, LLC, Dearborn, MI (US)

(72) Inventors: Mangesh Kadam, Canton, MI (US); Srinivas Reddy Malapati, Novi, MI (US); Yuqin Zhao, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/326,211

(22) Filed: May 31, 2023

(51) Int. Cl.
| | | |
|---|---|---|
| *B60R 21/207* | (2006.01) | |
| *B60N 2/02* | (2006.01) | |
| *B60N 2/06* | (2006.01) | |
| *B60N 2/18* | (2006.01) | |
| *B60N 2/427* | (2006.01) | |
| *B60N 2/52* | (2006.01) | |
| *B60R 21/013* | (2006.01) | |
| *B60R 21/231* | (2011.01) | |
| *B60R 21/268* | (2011.01) | |
| *B60R 21/00* | (2006.01) | |
| *B60R 21/264* | (2006.01) | |

(52) U.S. Cl.
CPC .......... *B60R 21/207* (2013.01); *B60N 2/0276* (2013.01); *B60N 2/06* (2013.01); *B60N 2/1803* (2013.01); *B60N 2/427* (2013.01); *B60N 2/525* (2013.01); *B60R 21/013* (2013.01); *B60R 21/23138* (2013.01); *B60R 21/268* (2013.01); *B60R 2021/0006* (2013.01); *B60R 2021/2076* (2013.01); *B60R 21/2644* (2013.01)

(58) Field of Classification Search
CPC ...... B60R 21/207; B60N 2/06; B60N 2/1803; B60N 2/427
See application file for complete search history.

(56) References Cited

U.S. PATENT DOCUMENTS

| | | | |
|---|---|---|---|
| 3,330,598 A | * | 7/1967 | Whiteside ............ B60N 2/0284 297/284.6 |
| 6,851,755 B2 | | 2/2005 | Dinkel et al. |
| 8,888,126 B2 | * | 11/2014 | Nukaya .............. B60N 2/42763 280/743.2 |
| 9,126,510 B2 | | 9/2015 | Hirako |
| 9,428,137 B2 | * | 8/2016 | Lee .................... B60N 2/42718 |
| 9,527,408 B2 | | 12/2016 | Stancato et al. |
| 9,550,439 B2 | * | 1/2017 | Dry ........................ B60N 2/206 |
| 9,731,638 B2 | | 8/2017 | Benson et al. |
| 9,937,826 B2 | | 4/2018 | Dry |
| 9,994,138 B2 | | 6/2018 | Whitens et al. |

(Continued)

*Primary Examiner* — Faye M Fleming
(74) *Attorney, Agent, or Firm* — Frank A. MacKenzie; Bejin Bieneman PLC

(57) ABSTRACT

An assembly includes a seat bottom, a rear bladder, a front bladder, and a check valve. The seat bottom includes a rear seat cushion and a front seat cushion in a seat-forward direction from the rear seat cushion. At least one of the rear seat cushion or the front seat cushion is vertically movable relative to the other one of the rear seat cushion or the front seat cushion. The rear bladder supports the rear seat cushion. The front bladder supports the front seat cushion. The check valve fluidly connects the front bladder and the rear bladder. The check valve is oriented to permit fluid to pass from the rear bladder to the front bladder and block fluid from passing from the front bladder to the rear bladder.

20 Claims, 9 Drawing Sheets

(56) References Cited

U.S. PATENT DOCUMENTS

| | | | |
|---|---|---|---|
| 10,899,251 B2* | 1/2021 | Dry | F16K 31/423 |
| 11,214,214 B2* | 1/2022 | Thomas | B60N 2/42709 |
| 11,738,675 B2* | 8/2023 | Therry | B60N 2/914 |
| | | | 297/284.1 |
| 2004/0051357 A1 | 3/2004 | Houle et al. | |
| 2006/0267325 A1* | 11/2006 | Kumagai | B60R 21/207 |
| | | | 280/753 |

* cited by examiner

VEHICLE SEAT WITH RESTRAINT SYSTEM

BACKGROUND

Vehicles include restraint systems. The restraint system for a seat of a vehicle is typically a three-point harness. The restraint system includes an anchor, a retractor, and a buckle. The anchor attaches one end of the webbing to a frame of the seat. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
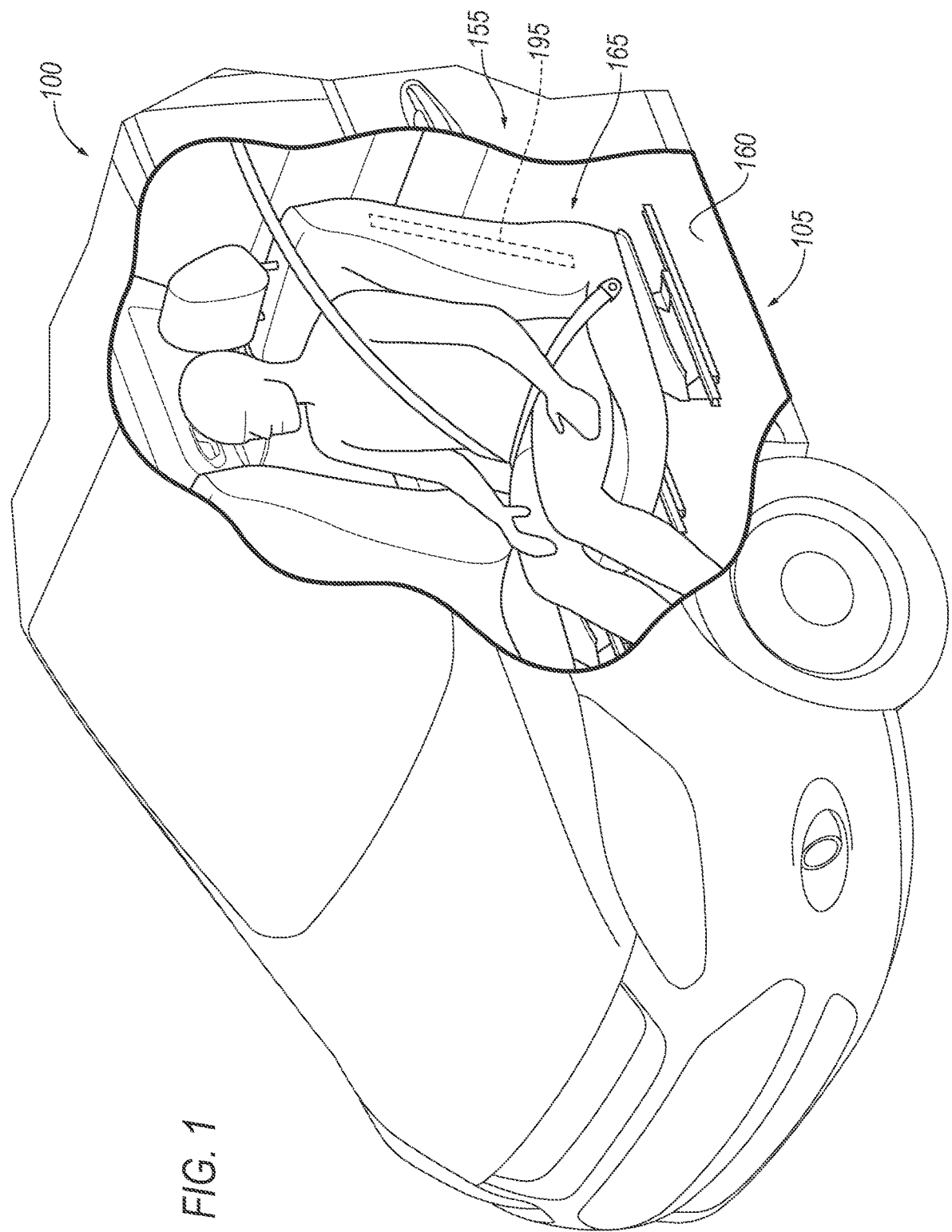
FIG. 1 is a perspective view of a portion of an example vehicle with a passenger compartment exposed for illustration.

An assembly includes a seat bottom, a rear bladder, a front bladder, and a check valve. The seat bottom includes a rear seat cushion and a front seat cushion in a seat-forward direction from the rear seat cushion. At least one of the rear seat cushion or the front seat cushion is vertically movable relative to the other one of the rear seat cushion or the front seat cushion. The rear bladder supports the rear seat cushion. The front bladder supports the front seat cushion. The check valve fluidly connects the front bladder and the rear bladder. The check valve is oriented to permit fluid to pass from the rear bladder to the front bladder and block fluid from passing from the front bladder to the rear bladder.

In an example, the check valve may be switchable between a closed state blocking fluid from passing from the rear bladder to the front bladder and an open state permitting fluid to pass from the rear bladder to the front bladder. In a further example, the check valve may be pyrotechnically activatable to switch from the closed state to the open state.

In another further example, the assembly may further include a computer communicatively coupled to the check valve, and the computer may be programmed to, in response to data indicating detection of a certain type to a vehicle, instruct the check valve to switch from the closed state to the open state. In a yet further example, the certain type may include certain impending impacts to the vehicle.

In an example, the front seat cushion may be a left front seat cushion, the front bladder may be a left front bladder, the seat bottom may include a right front seat cushion in the seat-forward direction from the rear seat cushion and in a seat-right direction from the left front seat cushion, and the assembly may further include a right front bladder supporting the right front seat cushion. In a further example, the check valve may be a left check valve, the assembly may further include a right check valve fluidly connecting the right front bladder and the rear bladder, and the right check valve may be oriented to permit fluid to pass from the rear bladder to the right front bladder and block fluid from passing from the right front bladder to the rear bladder. In a yet further example, the assembly may further include a computer communicatively coupled to the left check valve and right check valve, the left check valve may be switchable between a closed state blocking fluid from passing from the rear bladder to the left front bladder and an open state permitting fluid to pass from the rear bladder to the left front bladder, the right check valve may be switchable between a closed state blocking fluid from passing from the rear bladder to the right front bladder and an open state permitting fluid to pass from the rear bladder to the right front bladder, and the computer may be programmed to instruct the left check valve to switch from the closed state to the open state independently of the right check valve and to instruct the right check valve to switch from the closed state to the open state independently of the left check valve.

In another further example, the right front bladder may be fluidly isolated from the left front bladder.

In another further example, the rear bladder, the left front bladder, and the right front bladder may form a fluidly closed system.

In an example, the rear seat cushion may be vertically movable with a change in volume of the rear bladder.

In an example, the front seat cushion may be vertically movable with a change in volume of the front bladder.

In an example, the rear seat cushion and the front seat cushion may be vertically movable independently of each other.

In an example, the assembly may further include a track engaging the rear seat cushion and the front seat cushion together, and the rear seat cushion and the front seat cushion may be slidable relative to each other along the track.

In an example, the assembly may further include a seat back coupled to the seat bottom in a seat-rearward direction from the rear seat cushion. In a further example, the assembly may further include an airbag supported by the seat back and inflatable to an inflated position above the seat bottom. In a yet further example, the seat back may have a top half, and the airbag may extend from the top half in the inflated position. In a still yet further example, the seat back may have a bottom half at the seat bottom and a midpoint dividing the top half and the bottom half, and the airbag may extend below the midpoint in the inflated position.

In another further example, the check valve may be switchable between a closed state blocking fluid from passing from the rear bladder to the front bladder and an open state permitting fluid to pass from the rear bladder to the front bladder, and the airbag may be configured to inflate together with the check valve switching from the closed state to the open state.

In an example, the seat bottom may include a bottom panel supporting the rear bladder and the front bladder.

With reference to the Figures, wherein like numerals indicate like parts throughout the several views, an assembly 105 of a vehicle 100 includes a seat bottom 110, a rear bladder 125, at least one front bladder 115, 120, and at least one check valve 130, 135. The seat bottom 110 includes a rear seat cushion 140 and at least one front seat cushion 145, 150 in a seat-forward direction from the rear seat cushion 140. At least one of the rear seat cushion 140 or the front seat cushion 145, 150 is vertically movable relative to the other one of the rear seat cushion 140 or the front seat cushion 145, 150. The rear bladder 125 supports the rear seat cushion 140. The front bladder 115, 120 supports the front seat cushion 145, 150. The check valve 130, 135 fluidly connects the front bladder 115, 120 and the rear bladder 125. The check valve 130, 135 is oriented to permit fluid to pass from the rear bladder 125 to the front bladder 115, 120 and block fluid from passing from the front bladder 115, 120 to the rear bladder 125.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 155 to house occupants of the vehicle 100. The passenger compartment 155 includes a floor 160 and a plurality of seats 165 mounted to the floor 160. One or more of the seats 165 may be disposed in a front row of the passenger compartment 155, and one or more of the seats 165 may be disposed in a second row behind the front row. The passenger compartment 155 may also include seats 165 in a third row at a rear of the passenger compartment 155. The rest of this description discusses the assembly 105 for one seat 165, but multiple or all seats 165 in the passenger compartment 155 can each have an assembly 105 as described herein. The seats 165 are shown to be bucket seats in the front row and bench seats in the second row, but the seats 165 may be other types. The position and orientation of the seats 165 and components thereof may be adjustable by an occupant.

Figure 2:
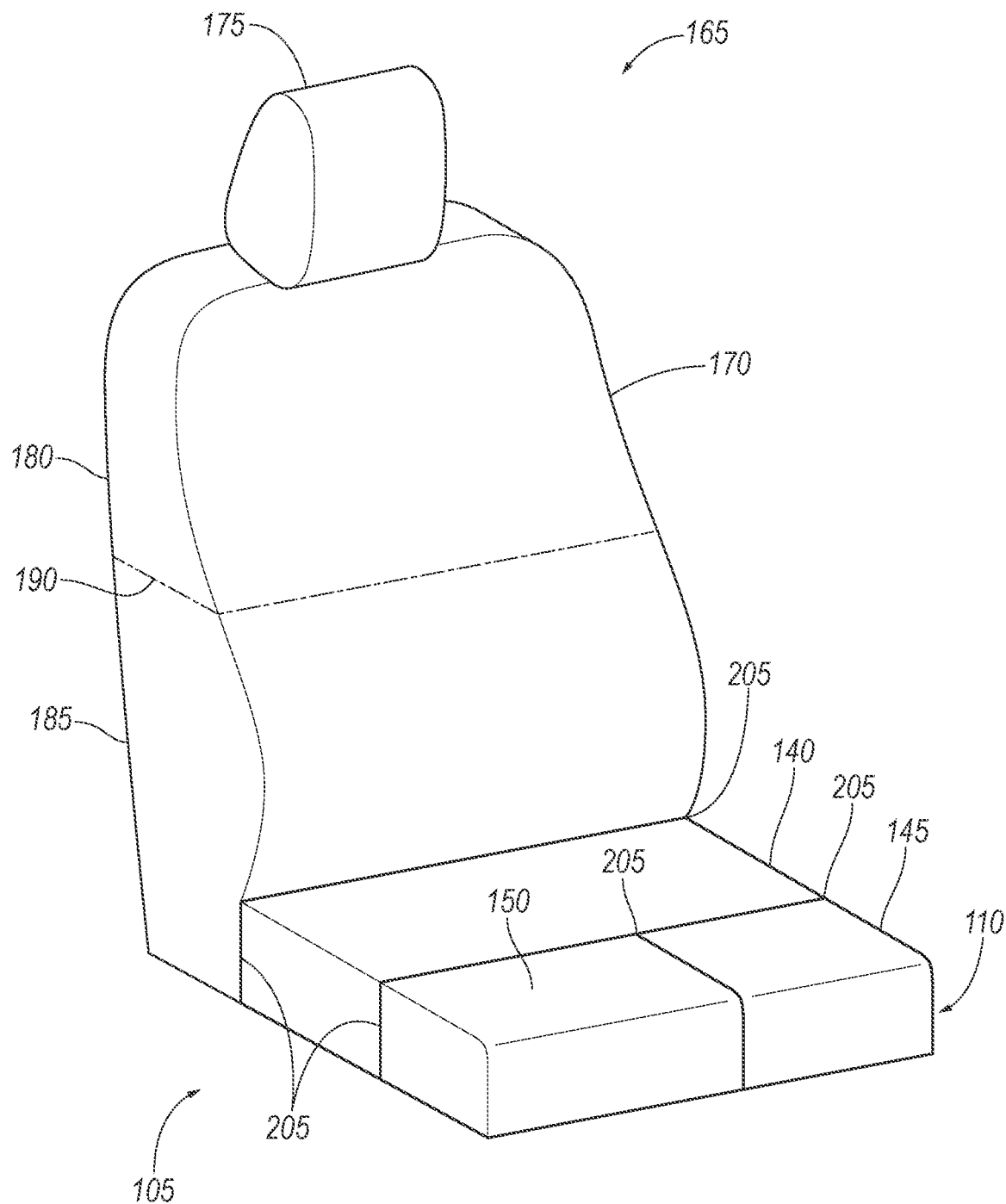
FIG. 2 a perspective view of an example seat of the vehicle.

With reference to FIG. 2, the seat 165 may include a seat back 170, the seat bottom 110, and a head restraint 175. The head restraint 175 may be supported by the seat back 170 and may be stationary or movable relative to the seat back 170. The seat back 170 may be supported by the seat bottom 110. The seat back 170 may be coupled to the seat bottom 110 in a seat-rearward direction from the rear seat cushion 140. The seat back 170 may be stationary or movable relative to the seat bottom 110. The seat back 170, the seat bottom 110, and/or the head restraint 175 may be adjustable in multiple degrees of freedom. Specifically, the seat back 170, the seat bottom 110, and/or the head restraint 175 may themselves be adjustable, in other words, adjustable components within the seat back 170, the seat bottom 110, and/or the head restraint 175, and/or may be adjustable relative to each other.

The seat back 170 may be divided into a top half 180 and a bottom half 185 along a length of the seat back 170 extending perpendicular to an axis of rotation of the seat back 170 relative to the seat bottom 110. The bottom half 185 is at the seat bottom 110, and the top half 180 is spaced from the seat bottom 110 by the bottom half 185. A midpoint 190 divides the top half 180 and the bottom half 185.

Figure 3A:
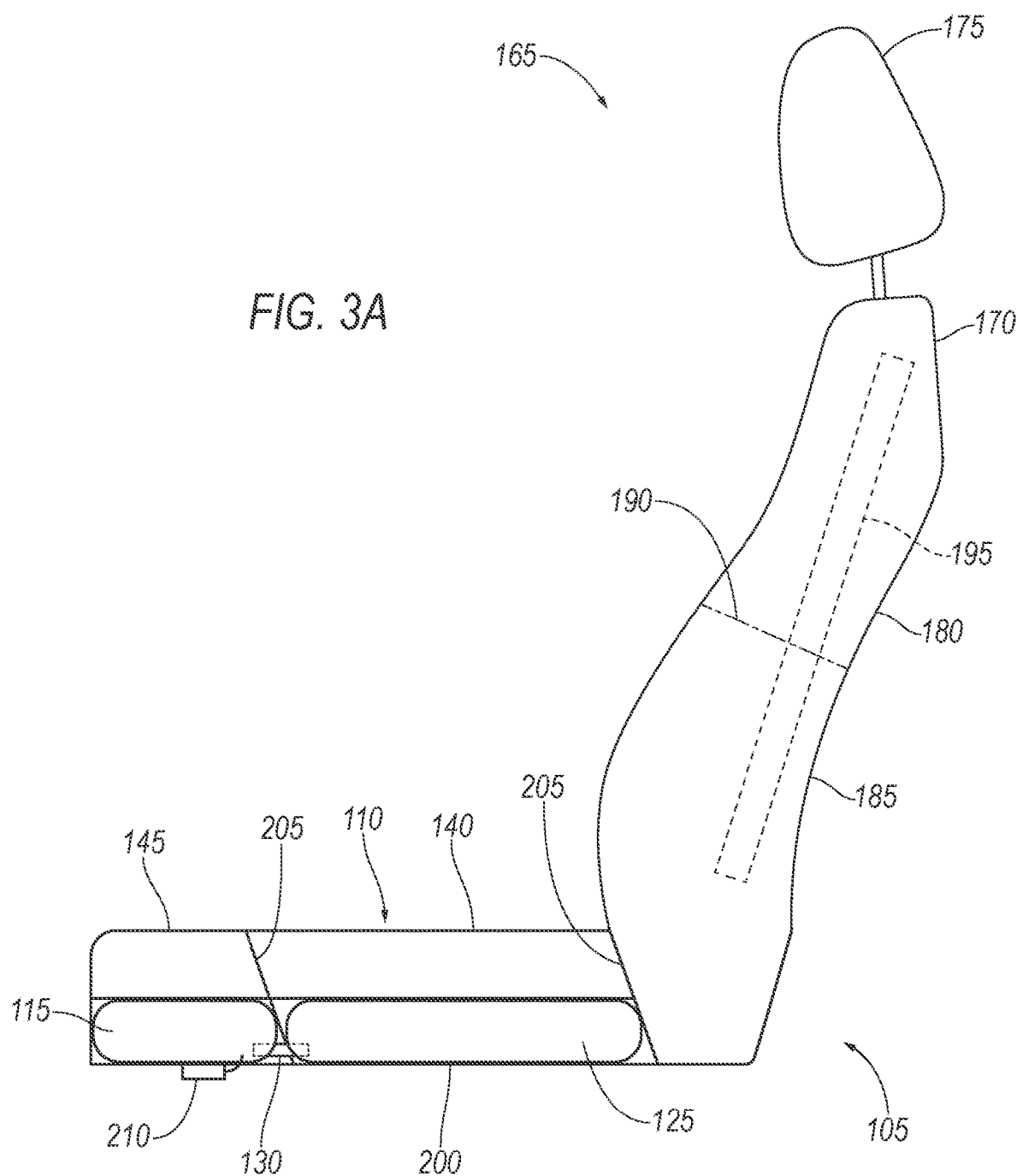
FIG. 3A is a side view of the seat with seat cushions of the seat bottom in default positions and an airbag in an uninflated position.
Figure 3B:
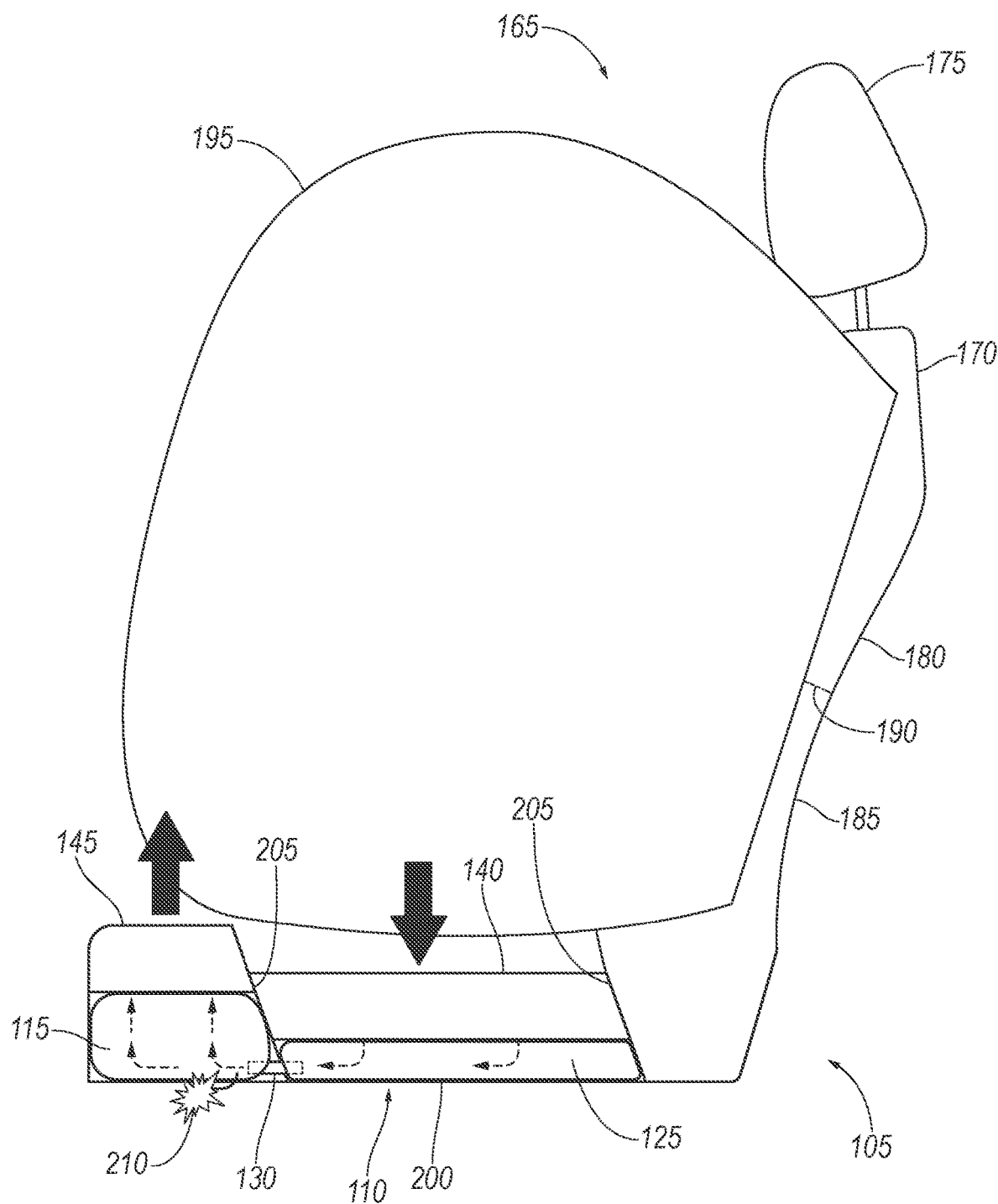
FIG. 3B is a side view of the seat with the seat cushions in moved positions and the airbag in the inflated position.

With reference to FIGS. 3A-B, the assembly 105 may include an airbag 195. The airbag 195 is supported by the seat back 170. The airbag 195 is inflatable from an uninflated position inside the seat back 170 (as shown in FIG. 3A) to an inflated position extending above the seat bottom 110 and outward from the seat back 170 (as shown in FIG. 3B). The airbag 195 in the uninflated position is located inside or underneath a covering of the seat back 170. The covering may include one or more tearaway seams that are opened by the inflation of the airbag 195. The airbag 195 in the inflated position is positioned laterally from an occupant sitting in the seat 165, e.g., between the occupant and a door of the vehicle 100 in a cross-vehicle direction, e.g., an outboard direction. The airbag 195 in the inflated position extends from the top half 180 of the seat back 170 and extends below the midpoint 190, e.g., extends from the bottom half 185 of the seat back 170, thereby providing coverage for a torso of the occupant. For example, the airbag 195 in the inflated position may extend straight forward from the side of the seat back 170 from which the airbag 195 inflated. For another example, the airbag 195 may extend beside and in front of the occupant, e.g., curling around the front of the occupant. The assembly 105 may include symmetrical airbags 195 on both sides of the seat back 170. The airbag 195 may include an inflator for inflating the airbag 195 with an inflation medium, such as a gas.

Figure 4A:
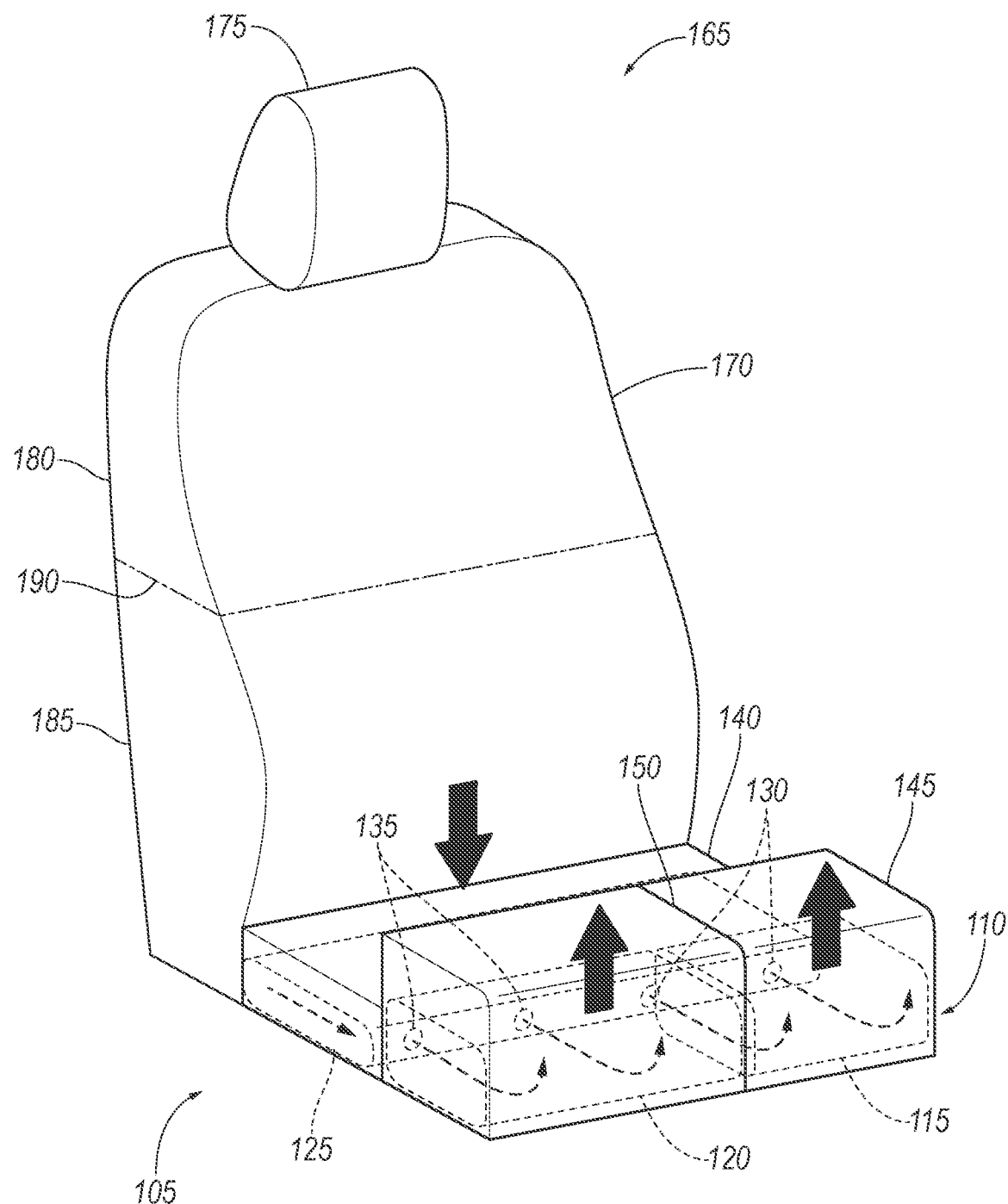
FIG. 4A is a perspective view of the seat with front seat cushions of the seat bottom in raised positions.
Figure 4B:
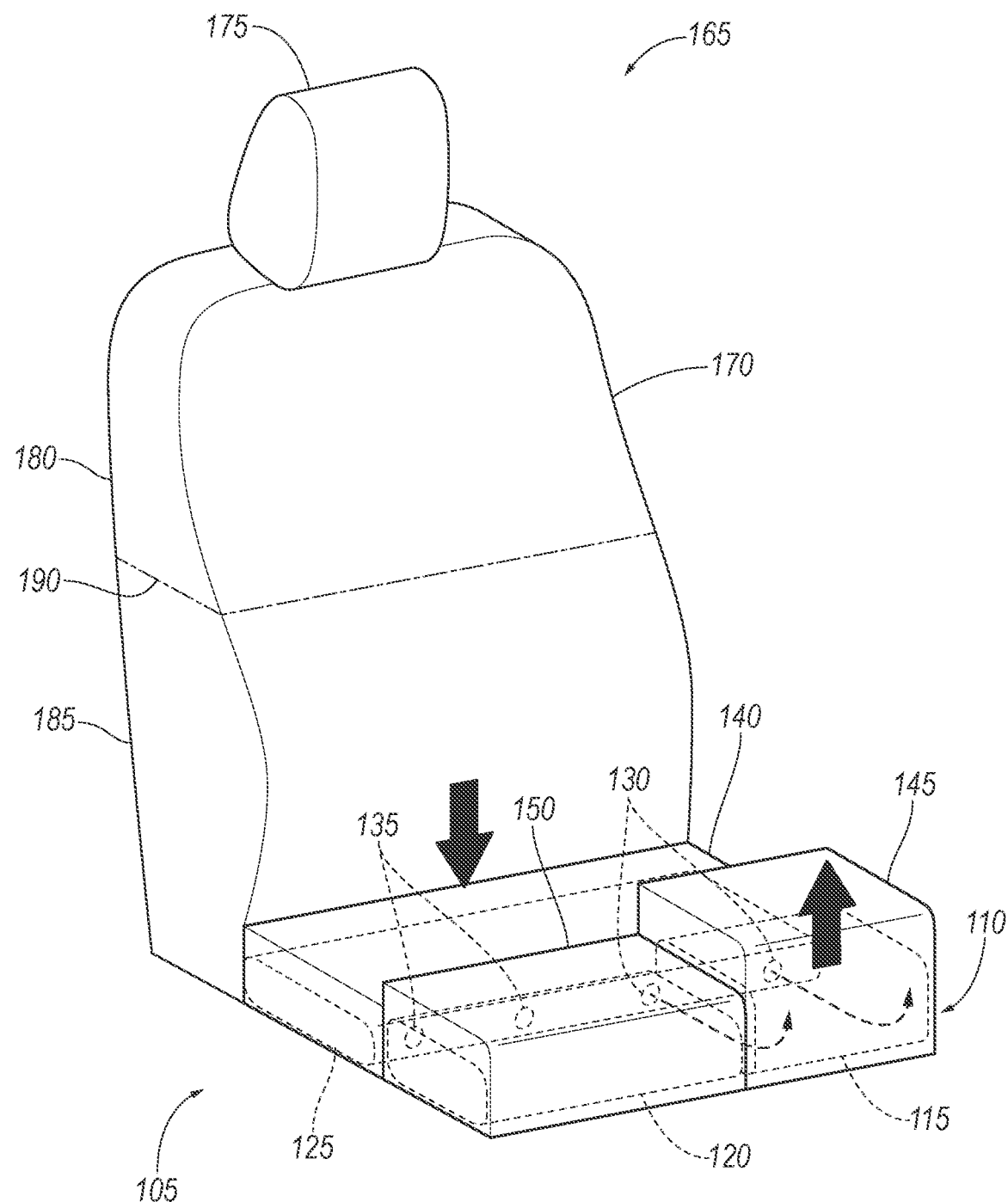
FIG. 4B is a perspective view of the seat with a left front seat cushion of the seat bottom in the raised position.
Figure 4C:
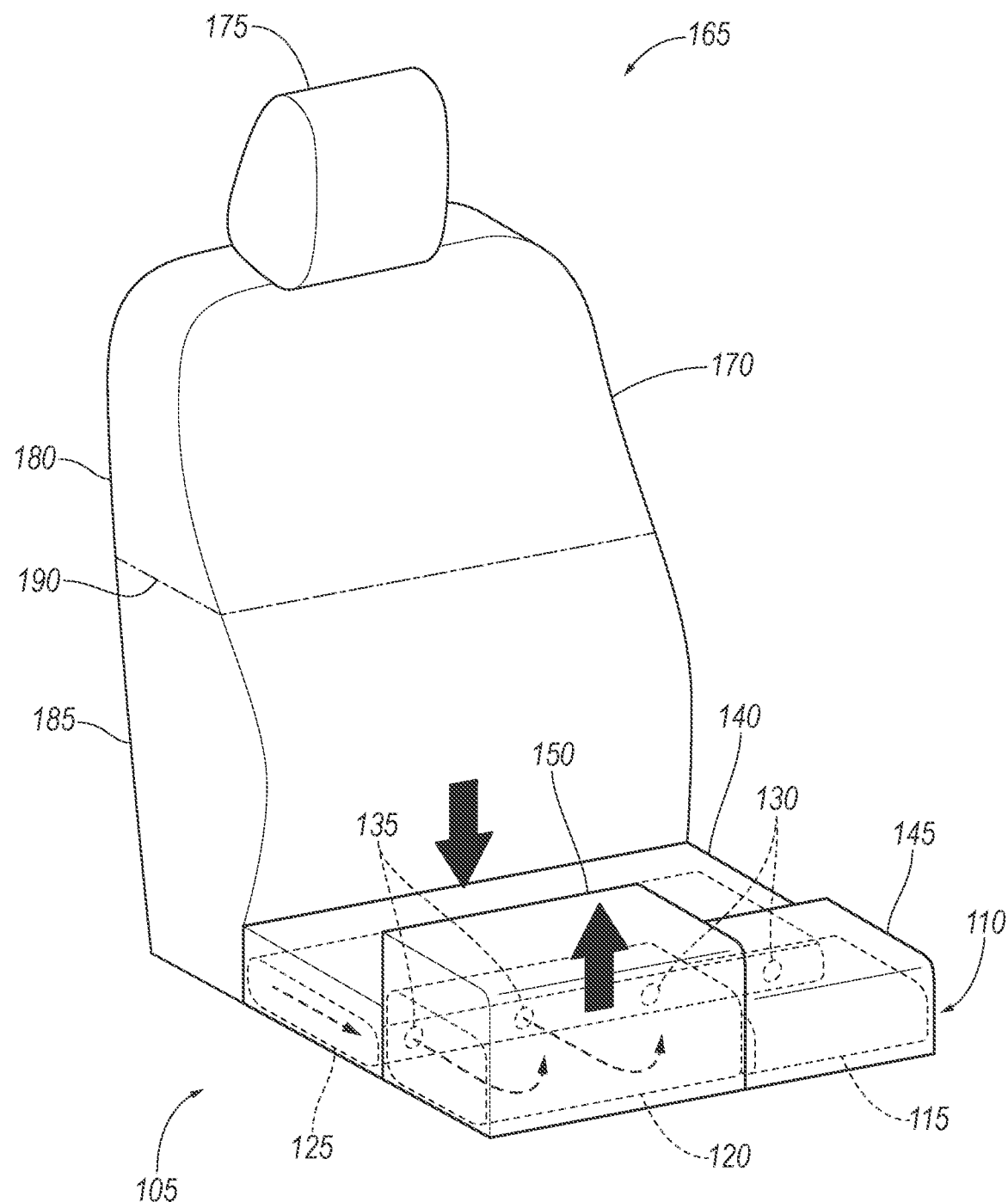
FIG. 4C is a perspective view of the seat with a right front seat cushion of the seat bottom in the raised position.

The seat bottom 110 includes a bottom panel 200, a left front bladder 115, a right front bladder 120 (shown in FIGS. 4A-C), the rear seat cushion 140, a left front seat cushion 145, a right front seat cushion 150 (shown in FIGS. 2 and 4A-C), tracks 205, at least one left check valve 130, and at least one right check valve 135 (shown in FIGS. 4A-C). The bottom panel 200 may be part of a seat frame of the seat 165, e.g., may be a seat pan. The bottom panel 200 extends below the seat cushions 140, 145, 150 and the bladders 115, 120, 125. The bottom panel 200 supports the bladders 115, 120, 125, the seat cushions 140, 145, 150, the check valves 130, 135, and the tracks 205. For example, the bottom panel 200 may be a rigid structure supporting the bladders 115, 120, 125, the seat cushions 140, 145, 150, the check valves 130, 135, and the tracks 205.

With reference to FIGS. 4A-C, the front seat cushions 145, 150 are positioned in a seat-forward direction from the rear seat cushion 140. The left front seat cushion 145 is positioned in the seat-forward direction from the rear seat cushion 140 and in a seat-left direction from the right front seat cushion 150. The right front seat cushion 150 is positioned in the seat-forward direction from the rear seat cushion 140 and in a seat-right direction from the left front seat cushion 145. The rear seat cushion 140 extends laterally, i.e., in the cross-seat direction, for the full width of the seat 165, thereby providing coverage for the full width of the pelvis of the occupant. The front seat cushions 145, 150 collectively extend laterally for the full width of the seat 165, thereby providing coverage for both thighs of the occupant. Each front seat cushion 145, 150 may be sized to support one of the thighs of the occupant, e.g., the front seat cushions 145, 150 may have approximately equal widths in the cross-seat direction. The seat cushions 140, 145, 150 may include cushions or padding covered with upholstery. The cushions may be made of cushioning material, e.g., foam or any other suitable supportive material. The upholstery may be formed of cloth, leather, faux leather, or any other suitable material. The upholstery may be stitched in panels around the foam.

At least one of the seat cushions 140, 145, 150 is vertically movable relative to the others of the seat cushions 140, 145, 150. For example, the front seat cushions 145, 150 may be vertically movable relative to the rear seat cushion 140, the rear seat cushion 140 may be movable relative to the front seat cushions 145, 150, or both. The seat cushions 140, 145, 150 are vertically movable independently of each other. The front seat cushions 145, 150 are each movable from a baseline position to a raised position, the raised position being above the baseline position. The rear seat cushion 140 is movable from a baseline position to a lowered position, the lowered position being below the baseline position. When the seat cushions 140, 145, 150 are in the baseline positions, top surfaces of the seat cushions 140, 145, 150 are contiguous with each other, e.g., may form a sufficiently continuous surface to serve as a seating area for the occupant to sit on in a normal sitting position. Each front seat cushion 145, 150 in the raised position has a top surface fully above the top surfaces of the other front seat cushion 145, 150 and the rear seat cushion 140 in the baseline positions. The rear seat cushion 140 in the lowered position has a top surface fully below the top surfaces of the front seat cushions 145, 150 in the baseline position, and the rear seat cushion 140 forms a recess relative to the front seat cushions 145, 150. When an occupant is seated in the seat, the pelvis of the occupant may drop into the recess, and the thighs of the occupant may be raised by the relatively higher positions of the front seat cushions 145, 150 (in either the baseline position or the raised position). The vertical movement of the seat cushions 140, 145, 150 is distinct from the adjustability of the seat 165.

Returning to FIGS. 3A-B, the tracks 205 facilitate movement of the seat cushions 140, 145, 150 relative to each other and relative to the bottom panel 200. The tracks 205 are supported by the bottom panel 200 and may be mounted at bottom ends to the bottom panel 200. The tracks 205 may be elongated generally vertically, e.g., at least 45° from horizontal. The tracks 205 are elongated parallel to each other. The tracks 205 may be positioned at corners of the rear seat cushion 140 as viewed from above and/or at corners of the front seat cushions 145, 150 as viewed from above. The tracks 205 may have a uniform cross-section projected along the directions of elongation to facilitate components engaging with and sliding along the tracks 205. In particular, each seat cushion 140, 145, 150 engages with the tracks 205 and is movable, e.g., slidable, along the tracks 205 between the baseline position and the raised or lowered position. Each seat cushion 140, 145, 150 may be slidable along the tracks 205 relative to the other seat cushions 140, 145, 150, i.e., independently of the other seat cushions 140, 145, 150.

The bladders 115, 120, 125 are positioned vertically between the bottom panel 200 and the seat cushions 140, 145, 150. The rear bladder 125 is positioned directly below the rear seat cushion 140. The left front bladder 115 is positioned directly below the left front seat cushion 145. The right front bladder 120 is positioned directly below the right front seat cushion 150. The front bladders 115, 120 are positioned in a seat-forward direction from the rear bladder 125. The left front bladder 115 is positioned in the seat-forward direction from the rear bladder 125 and in a seat-left direction from the right front bladder 120. The right front bladder 120 is positioned in the seat-forward direction from the rear bladder 125 and in a seat-right direction from the left front bladder 115.

The bladders 115, 120, 125 are bags enclosing a fluid. For example, the bladders 115, 120, 125 may be made of an elastomeric material. The bladders 115, 120, 125 may be individual bags or may be a single bag divided into chambers. The fluid may pass between the bladders 115, 120, 125 via the check valves 130, 135 in the manner described below. The fluid may be a gas, which may flow more quickly between the bladders 115, 120, 125 than a liquid. The check valves 130, 135 may provide the only paths for fluid to flow between the bladders 115, 120, 125, i.e., fluid may not flow from one bladder to another bladder except through one of the check valves 130, 135. The rear bladder 125, the left front bladder 115, and the right front bladder 120 may form a fluidly closed system. In other words, the bladders 115, 120, 125 may be collectively sealed and may prevent fluid from entering or leaving the bladders 115, 120, 125 as a unit.

The bladders 115, 120, 125 support the respective seat cushions 140, 145, 150, and the seat cushions 140, 145, 150 rest on the respective bladders 115, 120, 125. The rear bladder 125 supports the rear seat cushion 140, the left front bladder 115 supports the left front seat cushion 145, and the right front bladder 120 supports the right front seat cushion 150. Each seat cushion 140, 145, 150 is vertically movable with a change in volume of the respective bladder, as illustrated in FIGS. 3A-B. An increase in volume of one of the bladders 115, 120, 125 raises the respective seat cushion 140, 145, 150, and a decrease in volume of one of the bladders 115, 120, 125 lowers the respective seat cushion 140, 145, 150.

The seat bottom 110 includes the check valves 130, 135. A check valve is a valve that permits fluid to flow through the valve in only one direction. A check valve may also be called a nonreturn valve or a one-way valve. Each check valve 130, 135 includes a single inlet and a single outlet. The check valves 130, 135 may be any suitable type, e.g., ball check valves, diaphragm check valves, swing check valves, etc. In particular, the check valves 130, 135 may be stop-check valves, which are switchable between a closed state blocking fluid from passing in both directions and an open state permitting the one-way fluid flow.

The seat bottom 110 includes at least one left check valve 130, e.g., two left check valves 130, and at least one right check valve 135, e.g., two right check valves 135. Using multiple left check valves 130 or right check valves 135 helps tunability of the speed of airflow. The left check valves 130 fluidly connect the left front bladder 115 and the rear bladder 125. The right check valves 135 fluidly connect the right front bladder 120 and the rear bladder 125. The seat bottom 110 may lack check valves fluidly connecting the left front bladder 115 and the right front bladder 120.

The check valves 130, 135 are oriented to permit fluid to pass from the rear bladder 125 to the respective front bladders 115, 120 and block fluid from passing from the respective front bladders 115, 120 to the rear bladder 125. In particular, the left check valves 130 are oriented to permit fluid to pass from the rear bladder 125 to the left front bladder 115 and block fluid from passing from the left front bladder 115 to the rear bladder 125, and the right check valves 135 are oriented to permit fluid to pass from the rear bladder 125 to the right front bladder 120 and block fluid from passing from the right front bladder 120 to the rear bladder 125. Because the left front bladder 115 and the right front bladder 120 are fluidly connected only via the rear bladder 125 and because the check valves 130, 135 are oriented to block fluid flow into the rear bladder 125, the right front bladder 120 is fluidly isolated from the left front bladder 115.

Each check valve 130, 135 is switchable between the closed state blocking fluid from passing from the rear bladder 125 to the respective front bladder 115, 120 and an open state permitting fluid to pass from the rear bladder 125 to the respective front bladder 115, 120. The check valves 130, 135 block fluid from passing from the front bladders 115, 120 to the rear bladder 125 in both the closed state and the open state. The check valves 130, 135 are in the closed state by default. For example, each check valve 130, 135 is pyrotechnically activatable to switch from the closed state to the open state. The assembly 105 may include a respective explosive charge 210 for each check valve 130, 135. The charges 210 may discharge to switch the respective check valves 130, 135 from the closed state to the open state, e.g., by pulling a cord connected to the check valves 130, 135. The charges 210 may be combustible to produce a gas. The charges 210 may be formed of a solid mixture of substances that, when ignited, react to produce the gas. For example, the charges 210 may be formed of sodium azide ($NaNO_3$), potassium nitrate ($KNO_3$), and silicon dioxide ($SiO_2$), which react to form nitrogen gas ($N_2$).

Returning to FIGS. 4A-C, the left check valves 130 and the right check valves 135 are switchable independently of each other. The left check valves 130 and the right check valves 135 may be switched from the closed state to the open state together, as shown in FIG. 4A. The left check valves 130 may be switched from the closed state to the open state while the right check valves 135 remain in the closed state, as shown in FIG. 4B. The right check valves 135 may be switched from the closed state to the open state while the left check valves 130 remain in the closed state, as shown in FIG. 4C. When the check valves 130, 135 are switched from the closed state to the open state, a weight of the occupant may push the fluid from the rear bladder 125 through the open check valves 130, 135 to the respective front bladder(s) 115, 120, causing the rear seat cushion 140 to move from the baseline position to the lowered position and the respective front seat cushion(s) 145, 150 to move from the baseline position to the raised position. If only the left check valves 130 are in the open state, the left front seat cushion 145 moves to the raised position while the right front seat cushion 150 remains in the baseline position, as shown in FIG. 4B. If only the right check valves 135 are in the open state, the right front seat cushion 150 moves to the raised position while the left front seat cushion 145 remains in the baseline position, as shown in FIG. 4C.

Figure 5:
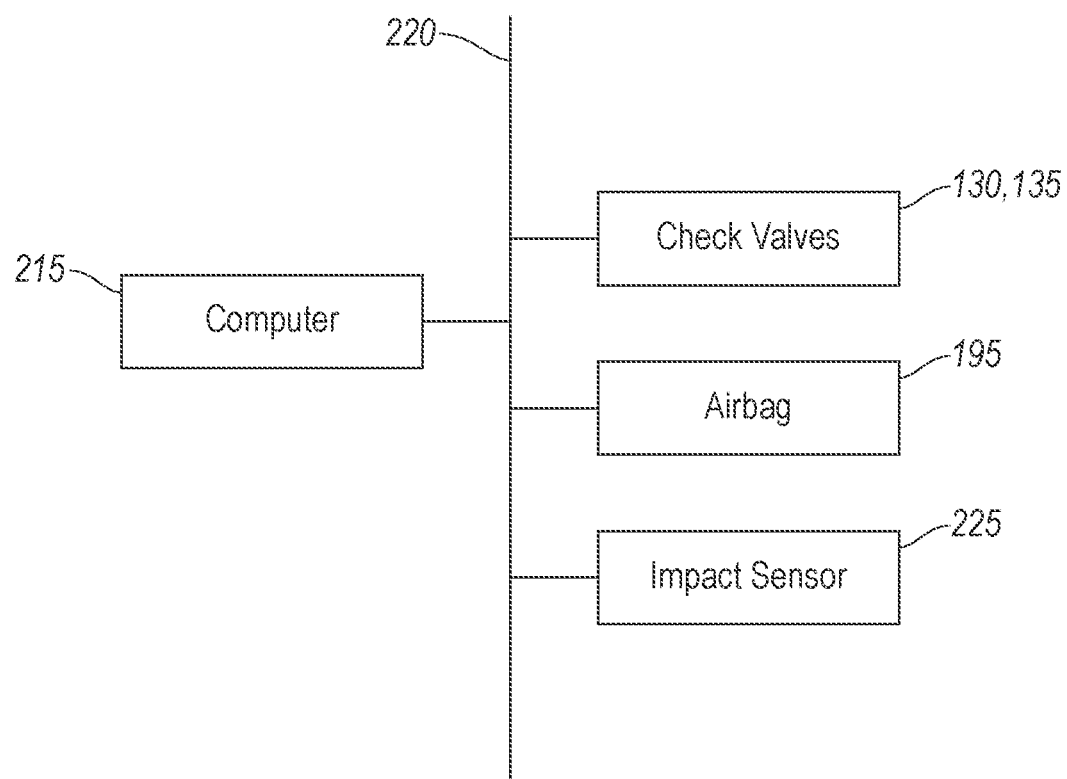
FIG. 5 is a block diagram of an example control system for the seat.

With reference to FIG. 5, the assembly 105 may include a computer 215. The computer 215 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 215 can thus include a processor, a memory, etc. The memory of the computer 215 can include media for storing instructions executable by the processor as well as for electronically storing data and/or databases, and/or the computer 215 can include structures such as the foregoing by which programming is provided. The computer 215 can be multiple computers coupled together.

The assembly 105 may include a communications network 220. The computer 215 may transmit and receive data through the communications network 220. The communications network 220 may be, e.g., a controller area network (CAN) bus, Ethernet, WiFi, Local Interconnect Network (LIN), onboard diagnostics connector (OBD-II), and/or any other wired or wireless communications network. The computer 215 may be communicatively coupled to the check valves 130, 135, the airbag 195, an impact sensor 225, and other components via the communications network 220.

The impact sensor 225 is adapted to detect certain impacts to the vehicle 100. The impact sensor 225 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 225 may be located at numerous points in or on the vehicle 100.

The computer 215 is programmed to, in response to data indicating detection of an impact of a certain type, instruct at least one of the check valves 130, 135 to switch from the closed state to the open state. The computer 215 may receive the data indicating the detection from the impact sensor 225 via the communications network 220. For the purposes of this disclosure, a "type" of impact is defined as a classification based on one or more detected characteristics of the impact. The characteristics may include force, relative speed, direction, location on the vehicle 100, object type (e.g., other vehicle, rigid barrier, etc.), etc. The certain type may include certain impending impacts to the vehicle 100, e.g., when the impact sensor 225 is a pre-impact sensor. The computer 215 may instruct the check valves 130, 135 to open by discharging the respective charges 210.

The computer 215 is programmed to instruct the left check valves 130 to switch from the closed state to the open state independently of the right check valves 135 and to instruct the right check valves 135 to switch from the closed state to the open state independently of the left check valves 130. For example, the computer 215 may select the left check valves 130, the right check valves 135, or both the right check valves 135 and the left check valves 130 to open based on certain types of certain impacts to the vehicle 100. The certain type may include certain impacts having a prestored direction. The computer 215 may select the left check valves 130 in response to certain left-directed frontal impacts, e.g., certain front angular left impacts or certain left-side small-overlap rigid-barrier (SORB) impacts. The computer 215 may select the right check valves 135 in response to certain right-directed frontal impacts, e.g., certain front angular right impacts or certain right-side small-overlap rigid-barrier (SORB) impacts. The computer 215 may select both the right check valves 135 and the left check valves 130 in response to certain straight frontal impacts.

The airbag 195 may be configured to inflate together with at least one of the check valves 130, 135 switching from the closed state to the open state. For example, the computer 215 may be programmed to transmit a common signal to the selected check valves 130, 135 and the airbag 195. For another example, the computer 215 may be programmed to inflate the airbag 195 and select from the check valves 130, 135 in response to a common stimulus, e.g., certain left-directed frontal impacts and/or certain right-directed frontal impacts. The airbag 195 may help keep the occupant laterally centered on the seat 165, which may be a position for which the front seat cushions 145, 150 may constrain the occupant from some forward motion.

Figure 6:
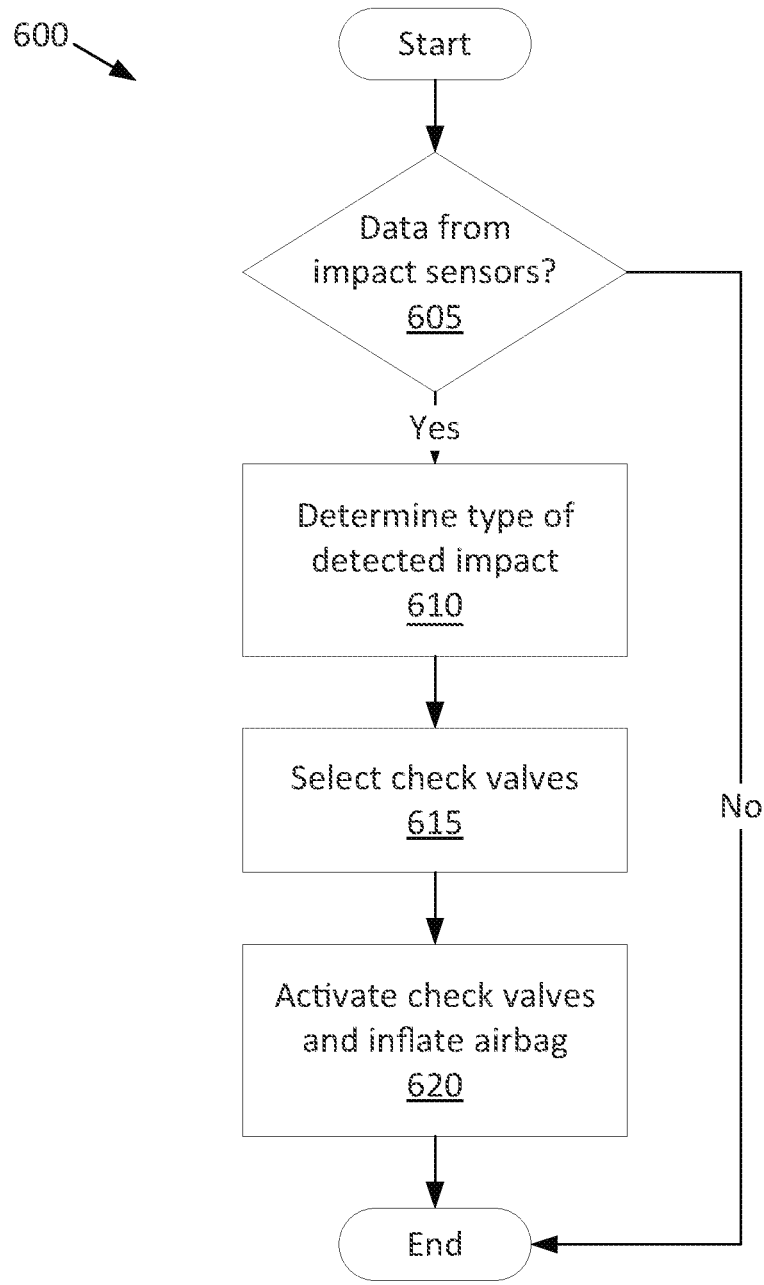
FIG. 6 is a flowchart of an example process for controlling the seat.

FIG. 6 is a flowchart illustrating an example process 600 for controlling the assembly 105. The memory of the computer 215 stores executable instructions for performing the steps of the process 600 and/or programming can be implemented in structures such as mentioned above. As a general overview of the process 600, the computer 215 determines whether the computer 215 has received data indicating certain impacts to the vehicle 100. If so, the computer 215 determines a type of the detected impact, selects the check valves 130, 135, activates the selected check valves 130, 135, and inflates the airbag 195. The computer 215 may execute the process 600 continuously while the vehicle 100 is on.

The process 600 begins in a decision block 605, in which the computer 215 determines whether the computer 215 has received data from the impact sensor 225 indicating detection of certain impacts, as described above. In response to the data, the process 600 proceeds to a block 610. Otherwise, the process 600 ends.

In the block 610, the computer 215 determines the type of the detected impact, including a direction of detected impact, as described above.

Next, in a block 615, the computer 215 selects the check valves 130, 135 based on the determined type, as described above.

Next, in a block 620, the computer 215 instructs the selected check valves 130, 135 to switch from the closed state to the open state and inflates the airbag 195, as described above. After the block 620, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Terms such as "front," "forward," "back," "rearward," "left," "right," "lateral," etc., are understood relative to the seat 165. Use of "in response to" and "upon determining" indicates a causal relationship, not merely a temporal relationship. The adjective "certain" refers to a subset of the class that it modifies. Many modifications and variations of the present disclosure are possible in light of the above teachings, and the disclosure may be practiced otherwise than as specifically described.

What is claimed is:
1. An assembly comprising:
  a seat bottom, the seat bottom including a rear seat cushion and a front seat cushion in a seat-forward direction from the rear seat cushion, at least one of the rear seat cushion or the front seat cushion being verti- cally movable relative to the other one of the rear seat cushion or the front seat cushion;

a rear bladder supporting the rear seat cushion;

a front bladder supporting the front seat cushion; and a check valve fluidly connecting the front bladder and the rear bladder, the check valve oriented to permit fluid to pass from the rear bladder to the front bladder and block fluid from passing from the front bladder to the rear bladder.

2. The assembly of claim 1, wherein the check valve is switchable between a closed state blocking fluid from passing from the rear bladder to the front bladder and an open state permitting fluid to pass from the rear bladder to the front bladder.

3. The assembly of claim 2, wherein the check valve is pyrotechnically activatable to switch from the closed state to the open state.

4. The assembly of claim 2, further comprising a computer communicatively coupled to the check valve, the computer being programmed to, in response to data indicating detection of an impact of a certain type to a vehicle, instruct the check valve to switch from the closed state to the open state.

5. The assembly of claim 4, wherein the certain type includes certain impending impacts to the vehicle.

6. The assembly of claim 1, wherein the front seat cushion is a left front seat cushion, the front bladder is a left front bladder, the seat bottom including a right front seat cushion in the seat-forward direction from the rear seat cushion and in a seat-right direction from the left front seat cushion, the assembly further comprising a right front bladder supporting the right front seat cushion.

7. The assembly of claim 6, wherein the check valve is a left check valve, the assembly further comprising a right check valve fluidly connecting the right front bladder and the rear bladder, the right check valve oriented to permit fluid to pass from the rear bladder to the right front bladder and block fluid from passing from the right front bladder to the rear bladder.

8. The assembly of claim 7, further comprising a computer communicatively coupled to the left check valve and right check valve, the left check valve is switchable between a closed state blocking fluid from passing from the rear bladder to the left front bladder and an open state permitting fluid to pass from the rear bladder to the left front bladder, the right check valve is switchable between a closed state blocking fluid from passing from the rear bladder to the right front bladder and an open state permitting fluid to pass from the rear bladder to the right front bladder, and the computer is programmed to instruct the left check valve to switch from the closed state to the open state independently of the right check valve and to instruct the right check valve to switch from the closed state to the open state independently of the left check valve.

9. The assembly of claim 6, wherein the right front bladder is fluidly isolated from the left front bladder.

10. The assembly of claim 6, wherein the rear bladder, the left front bladder, and the right front bladder form a fluidly closed system.

11. The assembly of claim 1, wherein the rear seat cushion is vertically movable with a change in volume of the rear bladder.

12. The assembly of claim 1, wherein the front seat cushion is vertically movable with a change in volume of the front bladder.

13. The assembly of claim 1, wherein the rear seat cushion and the front seat cushion are vertically movable independently of each other.

14. The assembly of claim 1, further comprising a track engaging the rear seat cushion and the front seat cushion together, wherein the rear seat cushion and the front seat cushion are slidable relative to each other along the track.

15. The assembly of claim 1, further comprising a seat back coupled to the seat bottom in a seat-rearward direction from the rear seat cushion.

16. The assembly of claim 15, further comprising an airbag supported by the seat back and inflatable to an inflated position above the seat bottom.

17. The assembly of claim 16, wherein the seat back has a top half, and the airbag extends from the top half in the inflated position.

18. The assembly of claim 17, wherein the seat back has a bottom half at the seat bottom and a midpoint dividing the top half and the bottom half, and the airbag extends below the midpoint in the inflated position.

19. The assembly of claim 16, wherein the check valve is switchable between a closed state blocking fluid from passing from the rear bladder to the front bladder and an open state permitting fluid to pass from the rear bladder to the front bladder, and the airbag is configured to inflate together with the check valve switching from the closed state to the open state.

20. The assembly of claim 1, wherein the seat bottom includes a bottom panel supporting the rear bladder and the front bladder.

* * * * *